Jan. 11, 1966     H. SCHWABE     3,228,047
TOE LASTING MACHINE WITH CEMENT APPLICATOR
Filed April 23, 1964     2 Sheets-Sheet 1
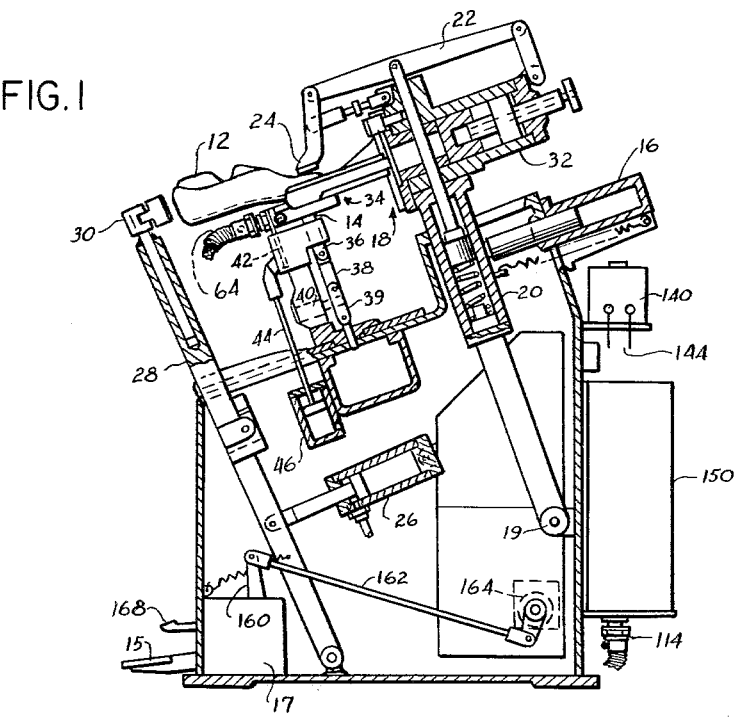
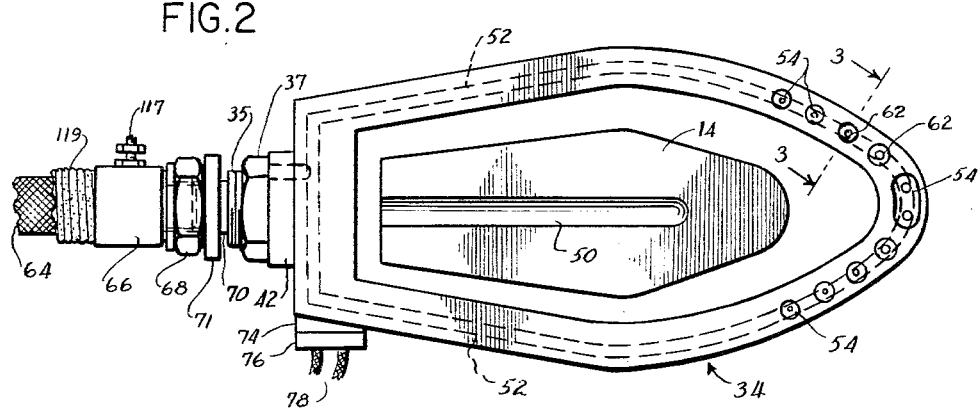
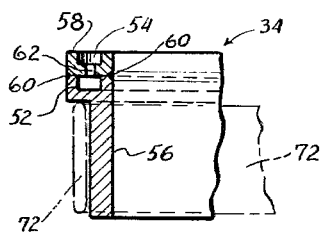
*INVENTOR.*
HERMAN SCHWABE
BY *James and Franklin*
ATTORNEYS Jan. 11, 1966　　　　H. SCHWABE　　　　3,228,047
TOE LASTING MACHINE WITH CEMENT APPLICATOR
Filed April 23, 1964　　　　　　　　　　2 Sheets-Sheet 2
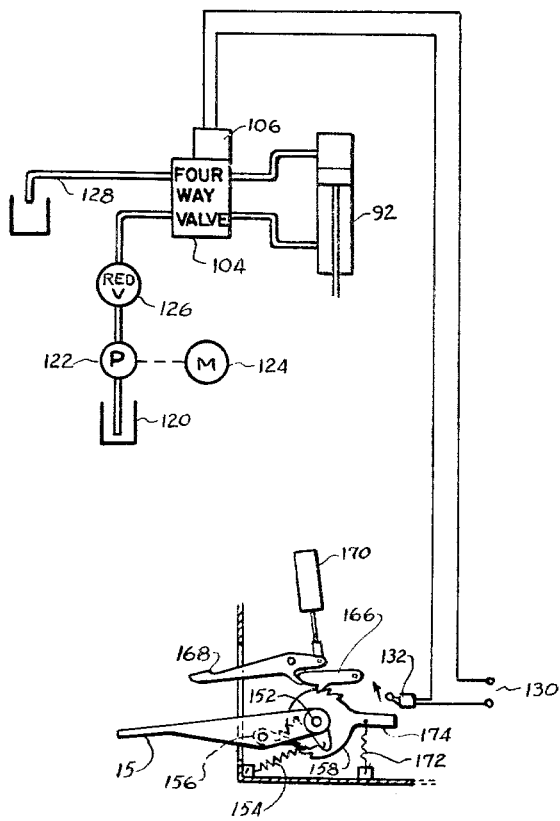
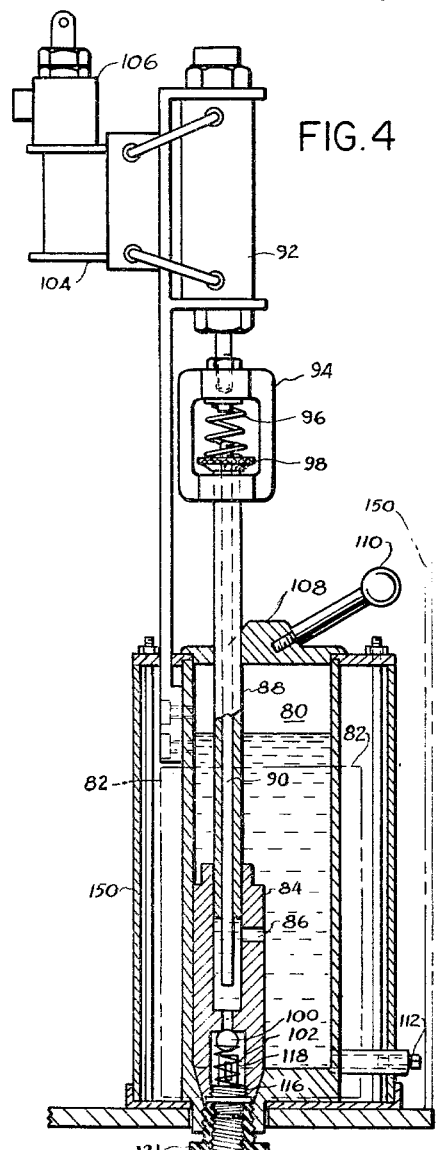
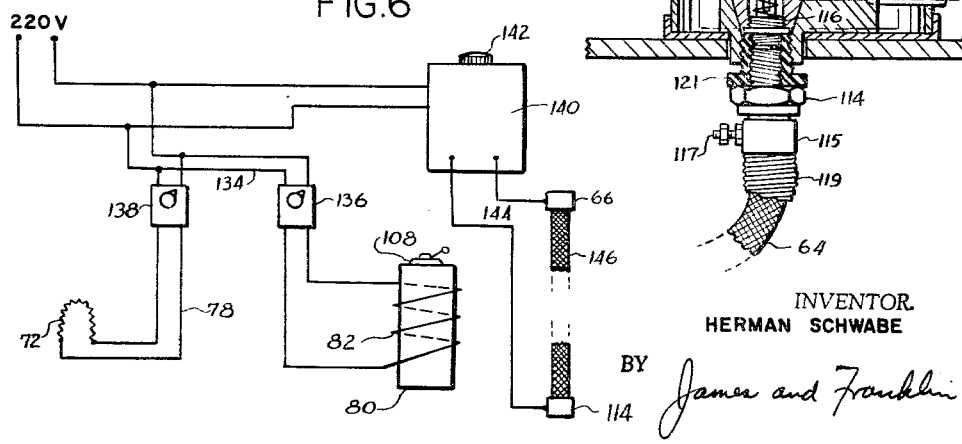
INVENTOR.
HERMAN SCHWABE
BY
James and Franklin
ATTORNEYS

United States Patent Office 3,228,047
Patented Jan. 11, 1966

3,228,047
TOE LASTING MACHINE WITH CEMENT APPLICATOR
Herman Schwabe, New York, N.Y., assignor to Universal Shoe Machinery Corp., Brooklyn, N.Y., a corporation of New York
Filed Apr. 23, 1964, Ser. No. 362,051
13 Claims. (Cl. 12—12.4)

This invention relates to toe lasting machines, and more particularly to such a machine having a cement applicator.

The usual practice is to pre-cement the inside of the bottom edge of the upper and the outside of the insole with a pressure-sensitive cement. It has also been suggested to apply cement as a part of the lasting operation, so that no previous or separate operation is needed. It has been proposed to do this by connecting a pressure supply of a thin liquid adhesive to an annular bottom support through a needle valve, the said support having small spray holes and when lowered acting as a spray to spray adhesive on the marginal portions of the upper and the insole.

The general object of the present invention is to improve lasting machines for the specified purpose, and more particularly to make it possible to use a very fast-acting cement. For this purpose it would be undesirable to spray the cement because of its fast-setting nature. Another object is to make it possible to use a viscous thermoplastic cement. In accordance with a feature and object of the present invention, the cement is kept in a heated chamber; it is applied to the insole by direct contact through cups in a heated annular support while that support is in tight contact with the insole; the cement is conveyed from the chamber to the support through a hose which is itself heated; a pump ejects a measured quantity of the cement and is itself submerged in the heated cement; special mechanism is provided to ensure dependable opening of the check valve of the submerged pump; and the same mechanism may be used to adjust the quantity of cement transferred.

To accomplish the foregoing general objects, and other more specific objects which will hereinafter appear, the invention resides in the lasting and cement applicator elements and their relation one to another, as are more particularly described in the specification. The specification is accompanied by drawings in which:

FIG. 1 is a schematic vertical section through a known lasting machine altered to embody features of the present invention;

FIG. 2 is a plan view of the bottom support and the applicator;

FIG. 3 is a section taken approximately in the plane of the line 3—3 of FIG. 2;

FIG. 4 is a partially sectioned elevation through the heated cement chamber and pump;

FIG. 5 is a flow and electrical diagram related to the foot treadle; and

FIG. 6 is an electrical diagram showing the heating of the chamber and hose and bottom support.

Referring to the drawing, and more particularly to FIG. 1, the lasting machine there shown is one made by Schoen & Cie, G.m.b.H. of Pirmasens, West Germany, it being their model 63C "Pulling Over and Toe Lasting Machine." The said machine is disclosed and described in United States Patent No. 3,066,329 of Albert Michel and Herbert Schindler, issued December 4, 1962, and entitled Machine for Pulling Over a Last and Gluing the Uppers of Shoes.

Referring to FIG. 1, a last 12 is preliminarily provided with an insole on its bottom and an upper around the last. The assembly is placed on a double bottom rest 14 and 34, and a treadle 15 is operated through several steps and/or several times, depending on the particular control mechanism used at 17. Without specifying a particular sequence at this time, an actuator or hydraulic cylinder 16 moves a machine head generally designated 18 toward the left about pivot 19 to bring the lasting mechanism to the shoe 12 on the support 14, 34; a cylinder at 20 causes a lever 22 to move a toe presser 24 against the top of the toe portion of the shoe; and a cylinder 26 causes a lever 28 to move a heel abutment 30 against the heel of the shoe. Five pincers, not shown (a toe pincer, two side pincers, and two ball pincers), pull the lower edge of the upper downwardly, this resulting from the operation of small hydraulic cylinders (not shown) controlling the individual pincers.

The double bottom rest consists of a main or bottom support 14 best shown in FIG. 2, surrounded by an annular support 34 which receives the marginal portion of the shoe. This is here used primarily as a heated cement applicator. In FIG. 1 the main bottom support 14 is mounted on a slide bar 36, and is controlled by toggle linkage 38, 39 which may be pushed sideward by an actuator cylinder 40 in order to lower the support 14. The applicator support 34 is carried by a post 42 moved by a rod 44 and an actuator cylinder 46. The applicator support 34 therefore may be lowered ahead of the bottom support 14. Another cylinder 32 then causes movement of the wipers. They are flat wiper blades which first move longitudinally of the shoe around its toe portion, and then inward, this motion being caused by the piston of actuator 32, which has a yoke or cross-bar the ends of which are connected by adjustable links to two wiper blade holders. There is a bodily movement toward the left as viewed in FIG. 1, and a pivotal movement toward one another. The applicator support 34 is lowered by actuator 46 and the pincers are released, before the wipers move in beneath the marginal portion of the shoe enough to support the shoe. The bottom support 14 is still elevated. The support 14 descends when actuator 40 releases the toggle 38, 39, thereby clearing the path for additional inward movement of the wipers.

Referring to FIGS. 2 and 2 of the drawing, the bottom support 14 may be conventional. It has a channel at 50 to proivde clearance for several downwardly projecting and subsequently removable tacks which locate the insole on the bottom of the last.

The applicator support 34 has a cement flow passage 52 terminating in upwardly directed cement discharge cups 54 around the toe portion. To more readily provide the passage 52, the support 34 is made of a lower member 56 (FIG. 3) having an open channel at 52, and an upper member 58 which is welded to the lower member as indicated at 60. The upper member 58 has the cement distributing cups 54, each connected to the annular passage 52 by means of a hole 62.

The annular passage 52 for the cement is in flow connection with a flexible supply hose 64, this having a suitable fitting 66 with an internally threaded rotatable element 68 for connection to a nipple 70 communicating with passage 52. The desired flow connection may be made in any conventional fashion, except that the hose 64 is to be a heated hose, and electrically and thermally insulated, as later described.

The applicator support 34 is itself provided with electrical heating means, and in the present case a conventional heating element 72 of the so-called "strip heater" type is used. This element 72 is shown in dotted lines in FIG. 3, but is not shown in FIG. 2 in order to avoid confusion with the flow passage 52. The heater is bent to U shape and follows the contour of the support 34, and is secured directly thereto. The ends of the resistor in the heater may emerge at a block 74 receiving any desired form of connector 76 with supply wires indicated at 78. Ordinary screw connections may be used.

Referring now to FIG. 4 of the drawing, the present machine includes a chamber 80 for a fast-acting thermoplastic cement. This chamber is heated by an electrical heating means or jacket indicated in broken lines at 82. A plunger pump is preferably submerged in chamber 80. In the present case there is a pump cylinder 84 having an inlet passage 86, and receiving an upright plunger 88 having a slender valve rod 90 passing therethrough. The pump is operated by an actuator 92, and this is connected by a yoke 94 to the upper end of the plunger 88. A compression spring 96 is disposed between the actuator 92 and the upper end of the valve rod 90.

The lower end of the pump cylinder 84 has a ball 100 urged upward by a compression spring 102 and acting as a check valve for the pump. The lower end of valve rod 90 projects well below the lower end of plunger 88, and bears against and opens the valve 100. This is found desirable because of the viscous nature of the cement, and the low pressure under which it is ejected. The amount of cement ejected may be varied by varying the downward projection of valve rod 90 below the plunger 88. For this purpose a screw adjustment is provided, there being a threaded knurled nut 98 which may be rotated to advance or retract the position of the lower end of the valve rod 90 relative to the plunger 88. The upper end of rod 90 is threaded to receive the nut 98, and spring 96 bears against nut 98.

There is a threaded bushing 116 which is threadedly received in the lower end of the pump cylinder 84. The upper end of bushing 116 preferably includes a generously windowed tubular portion 118 on which the check valve spring 102 is located.

The plunger is moved positively by means of yoke 94, but the valve rod 90 is moved yieldably by compression spring 96. Thus, when the valve rod has moved the ball 100 all the way down against the upper end of slotted tube 118, the rod readily yields to accommodate the further travel of the actuator and plunger.

Use of the valve rod has some further advantage in holding the valve open momentarily as the pump plunger rises, thereby providing a bit of suction or withdrawal of the heated cement at the cups of the applicator when the support is lowered. This guards against drip of adhesive material in the machine.

The actuator 92 here shown is hydraulically operated under control of a four-way valve 104, this being solenoid-operated by a solenoid indicated at 106. The chamber 80 may be replenished with cement by raising a cover 108 by means of a handle 110. The chamber 80 may be drained, should that become necessary, by means of a drain plug 112.

The pump discharge is led into hose 64, this having a fitting 114 at one end, which fitting is received in the lower end of the pump. The hose is preferably a Teflon hose, protectively enclosed in a wire braid which extends into the metal sleeve portion 115 of male fitting 114 (FIG. 4) and similar metal sleeve portion 66 of the female fitting (FIG. 2). A stud and nuts 117 are applied to the metal sleeves for electrical connection. An asbestos cord 119 is closely wound around the entire length of the braided hose from one metal fitting to the other. This serves two purposes, one being for heat insulation, and the other being for electrical insulation against contact with parts of the machine.

At each end of the hose a special fiber insulation bushing which is internally threaded and externally threaded is employed, thereby insulating the entire hose from the parts of the machine. This bushing is shown at 121 in FIG. 4.

The applicator 34 (FIG. 2) has a stud 35 which receives a nut 37 locking the same to the upright strap 42 which carries the applicator. Hollow stud 35 also has an internal thread which receives a short nipple 70, and nipple 70 receives the fiber insulation bushing 71. The external thread of bushing 71 receives the nut 68 of the female hose fitting.

Referring now to FIG. 5 of the drawing, hydraulic fluid is pumped from reservoir 120 by a pump 122 driven by a motor 124. The pressure may be regulated by a suitable reducing valve 126 connected to the four-way valve 104 which controls the actuator 92 for the ejector pump. Return of hydraulic fluid back to the tank is indicated at 128. The solenoid 106 which operates the four-way valve 104 is energized from a suitable source connected at 130, under control of a switch 132. This is operated by the foot treadle 15, as later explained.

The electrical circuitry for heating the thermoplastic adhesive material is schematically given in FIG. 6 of the drawing. Current from a 220-volt supply is led through conductors 134 to a temperature control element 136, most simply a Variac or a rheostat, and thence to the resistance heater 82 for the cement chamber 80.

The 220-volt supply is also connected to a separate temperature control unit 138, and thence through conductors 78, to the heating resistor 72 of the cement applicator. Here again the unit 138 may be a Variac or a rheostat.

The power supply is also led to a step-down transformer 140 having a high current low voltage output. The output may be varied under control of a handle 142. In the present case, the output voltage is variable from one to six volts. The ends of the hose are symbolically indicated at 66 and 114, and the high amperage heating current is thereby supplied through conductors 144 to the metal braid 146 of the hose. The hose is a commercially available Teflon hose in which the metal braid is provided for strength. However, in the present machine the cement is not under high pressure, and instead the metal braid is employed as a heating element for heating the entire length of the hose. It is because of the low resistance of the metal braid that the step-down transformer 140 is employed to provide the necessary high amperage at a safe low voltage. The insulation bushings insulate the hose ends from the machine.

Reverting to FIG. 1, the cement chamber and pump and its actuator are housed at 150. The step-down transformer is indicated at 140. The ends of the hose are shown at 64 beneath the last 12, and at 114 beneath the pump and chamber housing 150, but the intermediate connecting hose has been omitted, and also the conductors 144 from transformer 140, in order not to conceal other parts of the drawing.

Referring to FIG. 5, treadle 15 is pivoted at 152 and is normally urged upward by a restoring spring 154. It carries a pawl 156 engaging ratchet teeth on an oscillatable element 158. This causes operation of various parts of the machine in sequence. For example, in FIG. 1 it turns an arm 160 connected by a link 162 to one control mechanism at 164. The part 158 (FIG. 5) has additional ratchet teeth engaged by a holding pawl 166, and this is released by means of a release pedal 168. In some cases, the release may be timed automatically by means of a clock timer, in which case the timer controls an actuator 170 which turns release pedal 168, and thereby raises the holding pawl 166, whereupon the step-by-step control element 158 moves back to its starting position under influence of a suitable restoring spring, here indicated schematically at 172.

The controls operated in sequence by the step-by-step element 158 need not be described in detail because they form a part of the standard machine as shown, for example in the above mentioned patent No. 3,066,329. However, in the present case a switch 132 is added, and is arranged to be operated by an arm 174 which moves past the switch 132 partway through its step-by-step movement, as next explained in a summary of the operation of the machine.

The main foot treadle 15 is initially pressed partway down. This turns element 158 some, and causes the pincers to close against and grip the lower edge of the upper. At this time the operator can still freely adjust the position of the shoe. The treadle 15 is then pressed all the way down, which turns element 158 more, and causes the pincers to pull the upper downward and also causes the heel post 28 (FIG. 1) and pad 30 to move inward against the shoe by means of the actuator cylinder 26. Also arm 174 (FIG. 5) reaches and operates switch 132. The cement pump actuator 92 is operated and cement is applied, but is kept hot by the heated applicator, and does not set. The operator can further adjust the shoe somewhat if need be. Meanwhile the treadle 15 may move upward by means of its own restoring spring 154, but the ratcheted inside control member 158 remains latched in position.

The treadle is then pushed down a second time, and this turns element 158 further and causes the head 18 (FIG. 1) of the machine to move inward by action of cylinder 16; the toe pad 24 to come down against the shoe by action of cylinder 20; the applicator 34 begins to move down by action of cylinder 46; and the wipers move in partway under the action of cylinder 32. The pincers are released. The bottom support 14 moves down when actuator cylinder 40 breaks the toggle linkage 38, 39. Meanwhile the wipers continue moving all the way in by action of cylinder 32. The cement pump is not operated a second time even though the treadle is operated a second time.

The treadle 15 moves up under force of its restoring spring 154, and after a slight delay for the cement to harden, which may be only a matter of seconds, the operator touches the release pedal 168, which releases the holding dog 166 of the ratchet mechanism, which thereupon is restored to starting position by means of its own restoring spring 172. This release may, if desired, be automatically timed by means of a timer and actuator 170, but that is not essential.

The cement acts so fast that there is no need for the operator to work with two lasting machines, as was done when using slow-acting cements.

It is believed that the construction and operation of the improved toe lasting machine with cement applicator, as well as the advantages thereof, will be apparent from the foregoing detailed description. A very fast-acting thermoplastic cement may be employed. The operator can see the condition of the upper on the last, and can readjust the same as desired and without undue haste, there being no fast setting of the cement at that time. The continuous application of heat to the cement chamber and the applicator and the entire length of hose therebetween prevents premature setting of the cement despite its viscous and fast-setting nature.

It will be understood that while I have shown and described the invention in a preferred form, changes may be made without departing from the scope of the invention as sought to be defined in the following claims.

I claim:

1. A toe lasting machine comprising a bottom support, an annular applicator and support therearound, wiper blades, means controlled by a foot treadle to actuate said supports and blades, a chamber for a fast acting thermoplastic cement, heating means to heat the chamber, a plunger pump, an actuator for said pump to expel a single measured charge of cement, said applicator support having heating means and having a passage terminating in upwardly directed discharge holes around the toe portion, a flexible hose between said pump and said applicator support, heating means for said hose, and means to cause the actuator to operate the pump.

2. A toe lasting machine comprising a bottom support, an annular applicator and support therearound, wiper blades, means controlled by a foot treadle to actuate said supports and blades, a chamber for a fast acting thermoplastic cement, electrical heating means to heat the chamber, a plunger pump submerged in said chamber, an actuator for said pump to expel a single measured charge of cement, said applicator support having electrical heating means and having a passage terminating in upwardly directed discharge cups around the toe portion, a flexible hose between said pump and said applicator support, electrical heating means for said hose, and means controlled by said foot treadle to cause the actuator to operate the pump prior to lowering of the applicator support.

3. A toe lasting machine comprising a bottom support, an annular applicator and support therearound, wiper blades, means controlled by a foot treadle to actuate said supports and blades, a chamber for a fast acting thermoplastic cement, electrical heating means to heat the chamber, a plunger pump, an actuator for said pump to expel a single measured charge of cement, said applicator support having electrical heating means and having a passage terminating in upwardly directed discharge holes around the toe portion, a flexible hose between said pump and said applicator support, said hose including a metal braid, a step-down transformer for supplying a high current of low voltage, means so connecting said transformer to the ends of said braid that the braid acts to heat the hose, and means to cause the actuator to operate the pump.

4. A toe lasting machine comprising a bottom support, an annular applicator and support therearound, wiper blades, means controlled by a foot treadle to actuate said supports and blades, a chamber for a fast acting thermoplastic cement, electrical heating means to heat the chamber, a plunger pump, an actuator for said pump to expel a single measured charge of cement, said applicator support having electrical heating means and having a passage terminating in upwardly directed discharge holes around the toe portion, a flexible hose between said pump and said applicator support, said hose including a metal braid, a step-down transformer for supplying a high current of low voltage, means so connecting said transformer to the ends of said braid that the braid acts to heat the hose, and means controlled by said foot treadle to cause the actuator to operate the pump prior to lowering of the applicator support.

5. A toe lasting machine comprising a bottom support, an applicator and support therearound, wiper blades, means controlled by a foot treadle to actuate said supports and blades, a chamber for a fast acting thermoplastic cement, electrical heating means to heat the chamber, a plunger pump submerged in said chamber, an actuator for said pump to expel a single measured charge of cement, said applicator support having electrical heating means and having a flow passage terminating in upwardly directed discharge cups around the toe portion, a flexible hose between said pump and said applicator support, said hose including a metal braid, a step-down transformer for supplying a high current of low voltage, means so connecting said transformer to ends of said braid that the braid acts to heat the hose, and means controlled by said foot treadle to cause the actuator to operate the pump prior to lowering of the applicator support.

6. A toe lasting machine as defined in claim 1 in which the pump includes a plunger having a slender valve rod passing slidably therethrough, means connecting said actuator to the outer end of the plunger, a compression spring between the actuator and the outer end of the valve rod, the discharge end of the pump cylinder having a ball urged to closing position by a compression spring and acting as a check valve, said ball being pushed to open position by said valve rod when said plunger is actuated.

7. A toe lasting machine as defined in claim 1 in which the pump includes a plunger having a slender valve rod passing slidably therethrough, means connected said actuator to the outer end of the plunger, a compression spring between the actuator and the outer end of the valve rod, the discharge end of the pump cylinder having a ball urged to closing position by a compression spring and acting as a check valve, said ball being pushed to open position by said valve rod when said plunger is actuated, and means to adjust the initial projection of the inner end of the valve rod beyond the inner end of the plunger.

8. A toe lasting machine as defined in claim 3 in which the pump includes a plunger having a slender valve rod passing slidably therethrough, means connected said actuator to the outer end of the plunger, a compression spring between the actuator and the outer end of the valve rod, the discharge end of the pump cylinder having a ball urged to closing position by a compression spring and acting as a check valve, said ball being pushed to open position by said valve rod when said plunger is actuated.

9. A toe lasting machine as defined in claim 2 in which the pump includes an upright plunger having a slender valve rod passing slidably therethrough, means connected said actuator to the upper end of the plunger, a compression spring between the actuator and the upper end of the valve rod, the lower end of the pump cylinder having a ball urged upward to closing position by a compression spring and acting as a check valve, said ball being pushed downward by said valve rod when said plunger is actuated.

10. A toe lasting machine as defined in claim 2 in which the pump includes an upright plunger having a slender valve rod passing slidably therethrough, means connected said actuator to the upper end of the plunger, a compression spring between the actuator and the upper end of the valve rod, the lower end of the pump cylinder having a ball urged upward to closing position by a compression spring and acting as a check valve, said ball being pushed downward by said valve rod when said plunger is actuated, and means to adjust the initial projection of the lower end of the valve rod below the lower end of the plunger.

11. A toe lasting machine as defined in claim 5 in which the pump includes an upright plunger having a slender valve rod passing slidably therethrough, means connected said actuator to the upper end of the plunger, a compression spring between the actuator and the upper end of the valve rod, the lower end of the pump cylinder having a ball urged upward to closing position by a compression spring and acting as a check valve, said ball being pushed downward by said valve rod when said plunger is actuated.

12. A toe lasting and cementing machine comprising a chamber for a fast acting thermoplastic cement, electrical heating means to heat the chamber, a plunger pump submerged in said chamber, an actuator for said pump to expel a single measured charge of cement, a flexible hose between said pump and a cement applicator, electrical means to heat said hose, said pump including an upright plunger having a slender valve rod passing slidably therethrough, means connected said actuator to the upper end of the plunger, a compression spring between the actuator and the upper end of the valve rod, the lower discharge end of the pump cylinder having a ball urged upward to closing position by a compression spring and acting as a check valve, and said ball being pushed downward by said valve rod when said plunger is actuated.

13. A toe lasting and cementing machine comprising a chamber for a fast acting thermoplastic cement, electrical heating means to heat the chamber, a plunger pump submerged in said chamber, an actuator for said pump to expel a single measured charge of cement, a flexible hose between said pump and a cement applicator, electrical means to heat said hose, said pump including an upright plunger having a slender valve rod passing slidably therethrough, means connected said actuator to the upper end of the plunger, a compression spring between the actuator and the upper end of the valve rod, the lower discharge end of the pump cylinder having a ball urged upward to closing position by a compression spring and acting as a check valve, and said ball being pushed downward by said valve rod when said plunger is actuated, and means to adjust the initial projection of the lower end of the valve rod below the lower end of the plunger.

References Cited by the Examiner
UNITED STATES PATENTS

| 2,055,483 | 9/1936 | Engel | 12—7.1 |
| 2,633,099 | 3/1953 | Jorgensen | 118—415 |
| 3,035,287 | 5/1962 | Vlcet et al. | 12—12.4 |
| 3,066,329 | 12/1962 | Michel et al. | 12—10.8 |
| 3,094,726 | 6/1963 | Kamborian | 12—12.4 X |

FOREIGN PATENTS 1,075,986  2/1960  Germany.

JORDAN FRANKLIN, *Primary Examiner.*